United States Patent
Muramatsu et al.

(10) Patent No.: US 10,668,759 B2
(45) Date of Patent: Jun. 2, 2020

(54) HEAD VOLTAGE CORRECTING METHOD FOR INKJET PRINTING APPARATUS, AN APPARATUS USING SAME, AND A PROGRAM THEREOF

(71) Applicant: SCREEN HOLDINGS CO., LTD., Kyoto (JP)

(72) Inventors: Asuka Muramatsu, Kyoto (JP); Seiya Nomura, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 16/210,854

(22) Filed: Dec. 5, 2018

(65) Prior Publication Data

US 2019/0168513 A1    Jun. 6, 2019

(30) Foreign Application Priority Data

Dec. 6, 2017  (JP) ................... 2017-234408

(51) Int. Cl.
   *B41J 29/393*    (2006.01)
   *B41J 2/045*     (2006.01)
   *G06K 15/02*     (2006.01)
   *B41J 2/21*      (2006.01)

(52) U.S. Cl.
   CPC ......... *B41J 29/393* (2013.01); *B41J 2/04516* (2013.01); *B41J 2/04558* (2013.01); *B41J 2/2146* (2013.01); *G06K 15/027* (2013.01); *B41J 2029/3935* (2013.01)

(58) Field of Classification Search
   CPC .. B41J 29/393; B41J 2/04558; B41J 2/04516; B41J 2029/3935
   See application file for complete search history.

(56) References Cited

U.S. PATENT DOCUMENTS

| 8,398,195 B2* | 3/2013 | Kondo .................. B41J 29/393 |
| | | 347/10 |
| 2012/0007905 A1 | 1/2012 | Tuttnauer et al. |
| 2015/0145913 A1 | 5/2015 | Bansyo |
| 2018/0225555 A1* | 8/2018 | Doi ....................... G06K 15/027 |

FOREIGN PATENT DOCUMENTS

| JP | 2004-268426 A | 9/2004 |
| JP | 2013-244712 A | 12/2013 |
| JP | 2016-002662 A | 1/2016 |

OTHER PUBLICATIONS

Extended European Search Report issued in corresponding European Patent Application No. 18210335.8-1202, dated Apr. 9, 2019.

* cited by examiner

*Primary Examiner* — Julian D Huffman
(74) *Attorney, Agent, or Firm* — McDermott Will & Emery LLP

(57) ABSTRACT

A head voltage correcting method for inkjet printing apparatus which perform printing with a head having a plurality of head modules includes the following steps: a testing chart printing step for printing testing charts which includes a lowest density head module check pattern, satellite check patterns, band-by-band density variable patterns, and in-band density variable patterns; a lowest density head module determining step for determining a lowest density head module; a satellite-free drive voltage determining step; and a new reference voltage determining step for determining a drive voltage of the band-by-band density variable patterns of the adjacent head module to be a new reference voltage for the adjacent head module.

15 Claims, 13 Drawing Sheets

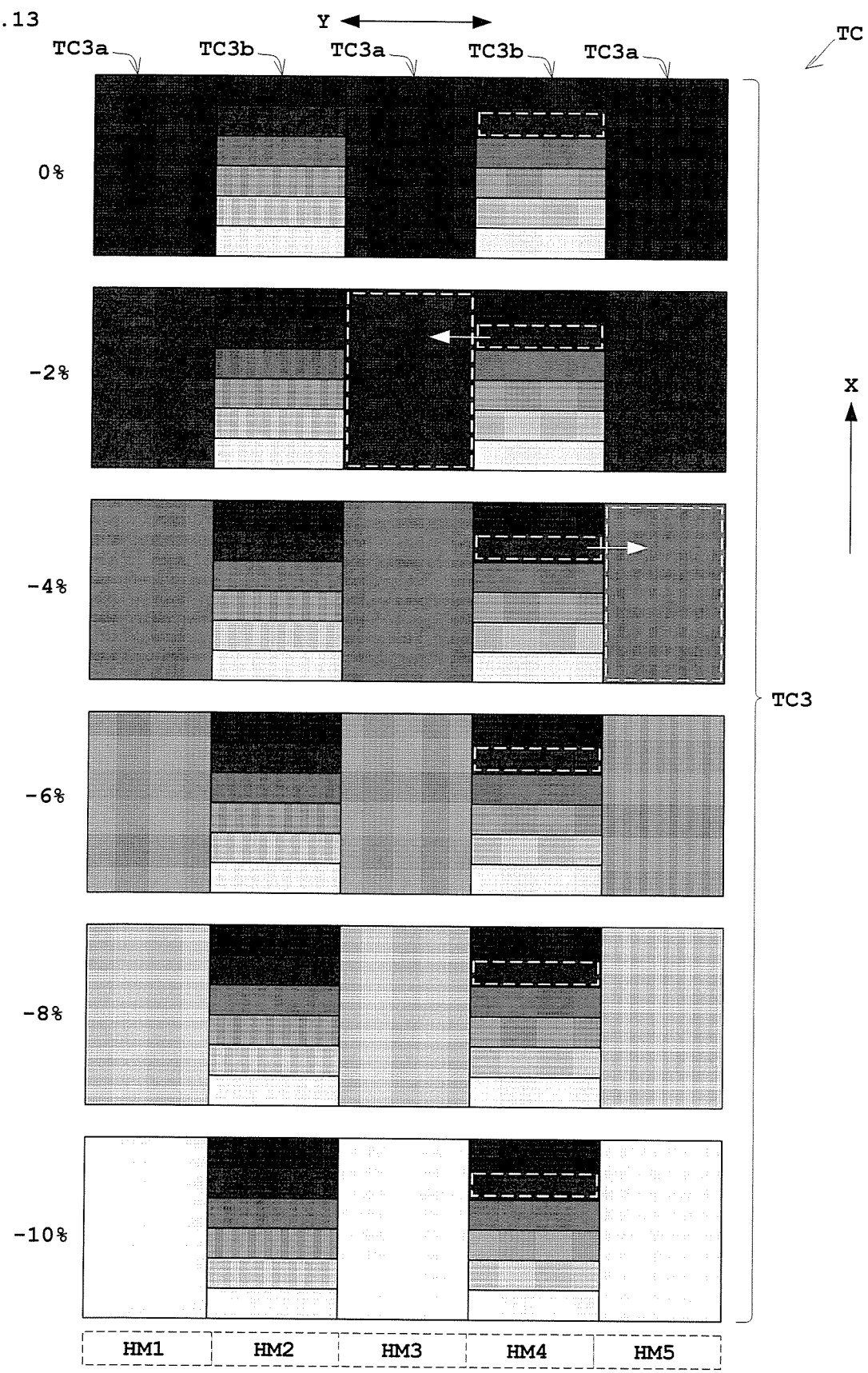

HEAD VOLTAGE CORRECTING METHOD FOR INKJET PRINTING APPARATUS, AN APPARATUS USING SAME, AND A PROGRAM THEREOF

BACKGROUND OF THE INVENTION (1) Field of the Invention

This invention relates to a head voltage correcting method for inkjet printing apparatus which perform printing on a printing medium by dispensing ink droplets thereto, to an apparatus using the same, and to a program thereof. In particular, the invention relates to a technique of voltage correction in a head having a plurality of head modules arranged in a direction perpendicular to a printing medium transport direction, each head module having a plurality of nozzles.

(2) Description of the Related Art

An inkjet printing apparatus performs printing by dispensing ink droplets from head modules to a printing medium. Since there are an individual difference from one head module to another and a question of print quality, adjustment is made at the time of manufacture to be capable of dispensing ink droplets in a predetermined density level which satisfies the specifications, and a voltage used at that time is set as reference voltage. Then, at the time of printing, the head modules are given a drive voltage shifted from the reference voltage according to the density of print data.

However, despite whatever adjustment is made in advance, when the head modules are installed on the apparatus, a defective dispensation of ink droplets may occur due to electrical characteristics of the board which drives the head modules or slight displacements of the head modules. With the defective dispensation in this case, the ink droplets may be in the form of main droplets and satellite droplets (also called mists) following the main droplets. Print quality will deteriorate particularly when excessive distances occur between the main droplets and satellite droplets. In order to inhibit the deterioration of print quality, therefore, an adjustment is made to lower the drive voltage for decreasing the satellite droplets (see Japanese Patent No. 4497825, for example).

So, a conventional head voltage correcting method for inkjet printing apparatus is executed as follows. Testing charts are first printed on printing paper, and the testing charts are read to correct a reference voltage. Specifically, droplet images including main droplets and satellite droplets are acquired, the lengths of the droplet images are obtained, and differences between these lengths and the length of an ideal droplet image are determined. Then the reference voltage is corrected to reduce the differences (see Japanese Unexamined Patent Publication No. 2016-2662, for example).

Incidentally, there is a type of inkjet printing apparatus that includes a head having a plurality of head modules arranged in a direction perpendicular to a transport direction of printing paper to enable printing over a full width in the direction perpendicular to the transport direction of printing paper. In such a construction, generally, since the board is different from one head module to another, the reference voltage noted above is set for each head module.

However, the conventional example with such construction has the following problem.

Where the head is constructed of a plurality of head modules, the conventional method may adjust the reference voltage for the head modules to avoid occurrence of the satellite droplets in order to inhibit the deterioration of print quality. This poses a problem that, even if the adjustment is made for one head module, it may be impossible to make similar adjustment also for adjacent head modules to uniform density, or may require very complicated adjustment.

SUMMARY OF THE INVENTION

This invention has been made having regard to the state of the art noted above, and its object is to provide a head voltage correcting method for inkjet printing apparatus, and an apparatus using the same, capable of easily uniforming ink droplet density for a plurality of head modules while inhibiting the deterioration of print quality, which is achieved by devising testing charts.

To fulfill the above object, this invention provides the following construction.

This invention provides a head voltage correcting method for inkjet printing apparatus which perform printing on a printing medium with a head having a plurality of head modules, each with a plurality of nozzles for dispensing ink droplets, the head modules being arranged in a direction perpendicular to a transport direction of the printing medium, the method comprising a testing chart printing step for printing testing charts on the printing medium, the testing charts including a lowest density head module check pattern printed by using, as a drive voltage, a reference voltage set beforehand for each of the head modules; satellite check patterns printed with respective drive voltages along the transport direction while changing the drive voltage at predetermined steps from the reference voltage for each of the head modules; band-by-band density variable patterns printed by one of the head modules, each by using a certain drive voltage over a predetermined length in the transport direction, which patterns being printed while changing the drive voltage at predetermined steps for each predetermined length in the transport direction; and in-band density variable patterns printed by a head module adjacent the one of the head modules, each of which patterns is printed by changing the drive voltage at predetermined steps within the predetermined length in the transport direction of the band-by-band density variable patterns; a lowest density head module determining step for determining, from the lowest density head module check pattern, a head module with minimum density to be a lowest density head module; a satellite-free drive voltage determining step for determining, from the satellite check patterns, the drive voltage which does not cause the lowest density head module to produce satellites, to be a satellite-free drive voltage, and determining the satellite-free drive voltage to be a new reference voltage for the lowest density head module; and a new reference voltage determining step, regarding the band-by-band density variable patterns printed by using the satellite-free drive voltage among the band-by-band density variable patterns by the lowest density head module, and the in-band density variable patterns by the adjacent head module, for determining a drive voltage of the in-band density variable patterns of the adjacent head module having density in agreement in the direction perpendicular to the transport direction to be a new reference voltage for the adjacent head module, or regarding those printed by using the satellite-free drive voltage of the in-band density variable patterns by the lowest density head module, and the band-by-band density variable patterns by the adjacent head module, for determining a drive voltage of the band-by-band density variable patterns of the adjacent head module having density in agreement in the direction perpendicular to the transport direction to be a new reference voltage for the adjacent head module, where there is a further adjacent head module provided adjacent the adjacent head module, regarding those printed by using the new reference voltage for the adjacent head module of the in-band density variable patterns by the adjacent head module, and the band-by-band density variable patterns by the further adjacent head module, among the band-by-band density variable patterns by the further adjacent head module adjacent the adjacent head module, for determining a drive voltage of the band-by-band density variable patterns of the further adjacent head module having density in agreement in the direction perpendicular to the transport direction to be a new reference voltage for the further adjacent head module, or regarding those printed by using the new reference voltage for the adjacent head module of the band-by-band density variable patterns by the adjacent head module, and the in-band density variable patterns by the further adjacent head module, among the in-band density variable patterns by the further adjacent head module adjacent the adjacent head module, for determining a drive voltage of the in-band density variable patterns of the further adjacent head module having density in agreement in the direction perpendicular to the transport direction to be a new reference voltage for the further adjacent head module.

According to this invention, a lowest density head module is determined out of a plurality of head modules by using the lowest density head module check pattern, a satellite-free drive voltage is determined based on this lowest density head module and satellite check patterns, and this drive voltage is set as a new reference voltage for the lowest density head module. Then, drive voltages corresponding to the in-band density variable patterns or band-by-band density variable patterns of the adjacent head module having density in agreement with the density by the satellite-free drive voltage of the in-band density variable patterns or band-by-band density variable patterns printed by the lowest density head module are set as new reference voltage for the adjacent head modules. Further, when there is a head module further adjacent the adjacent head module, drive voltage corresponding to the in-band density variable patterns or band-by-band density variable patterns of the further adjacent head module having density in agreement with the density by the new reference voltage of the band-by-band density variable patterns or in-band density variable patterns printed by the adjacent head module is set as a new reference voltage for the further adjacent head module. Thus, the satellite-free drive voltage which produces no satellite is made a reference voltage for the lowest density head module, and drive voltage of the adjacent and further adjacent head modules in agreement with the density by the reference voltage are made reference voltages. Consequently, since the drive voltages for the adjacent head module and further adjacent head modules which are lower than that of the lowest density head module become reference voltages, the adjacent head module and further adjacent head module are also given drive voltages free from satellites. As a result, the density levels of ink droplets can easily be uniformed among the plurality of head modules, while inhibiting a deterioration of print quality.

The phrase "in agreement with the density" used herein refers to the case of a density difference being zero or minimal.

In this invention, it is preferred that the method further comprises an image acquiring step executed after the testing chart printing step for acquiring testing pattern images by scanning the testing patterns; wherein the lowest density head module determining step, the satellite-free drive voltage determining step, and the new reference voltage determining step are executed by image processing of the testing pattern images.

Since image processing of the test pattern images acquired in the image acquiring step is carried out to determine the lowest density head module, for example, the process can be performed efficiently and accurately.

In this invention, it is preferred that the lowest density head module check pattern is a solid of 60% target density by the reference voltage.

Since the density of 60% is not too dense and not too thin, people can visually determine the lowest density head module with ease.

In this invention, it is preferred that the predetermined steps are set to −2% each from reference voltage 0%.

When the predetermined steps are too fine, efficiency will lower. When they are too rough, accuracy lowers. The predetermined steps of 2% can maintain good efficiency and yet appropriate accuracy.

In this invention, it is preferred that the band-by-band density variable patterns and the in-band density variable patterns of the testing charts are printed alternately in the direction perpendicular to the transport direction of the printing medium.

With the band-by-band density variable patterns and in-band density variable patterns printed alternately, density comparison can be made easily in the direction perpendicular to the transport direction.

In another aspect of this invention, an inkjet printing apparatus is provided for printing on a printing medium by dispensing ink droplets thereto, the apparatus comprising a head including a plurality of head modules arranged in a direction perpendicular to a transport direction of the printing medium, each of the head modules having a plurality of nozzles for dispensing the ink droplets; a transporting device disposed in a position spaced from and opposed to the head for transporting the printing medium; and a printing controller for printing testing charts on the printing medium, the testing charts including a lowest density head module check pattern printed by using, as a drive voltage, a reference voltage set beforehand for each of the head modules; satellite check patterns printed with respective drive voltages along the transport direction while changing the drive voltage at predetermined steps from the reference voltage for each of the head modules; band-by-band density variable patterns printed by one of the head modules, each by using a certain drive voltage over a predetermined length in the transport direction, which patterns being printed while changing the drive voltage at predetermined steps for each predetermined length in the transport direction; and in-band density variable patterns printed by a head module adjacent the one of the head modules, each of which patterns is printed by changing the drive voltage at predetermined steps within the predetermined length in the transport direction of the band-by-band density variable patterns; wherein, from the lowest density head module check pattern, a head module with minimum density is determined to be a lowest density head module; from the satellite check patterns, the drive voltage which does not cause the lowest density head module to produce satellites is determined to be a satellite-free drive voltage, and the satellite-free drive voltage is determined to be a new reference voltage for the lowest density head module; and regarding the band-by-band density variable patterns printed by using the satellite-free drive voltage among the band-by-band density variable patterns by the lowest density head module, and the in-band density variable patterns by the adjacent head module, a drive voltage of the in-band density variable patterns of the adjacent head module having density in agreement in the direction perpendicular to the transport direction is determined to be a new reference voltage for the adjacent head module, or regarding those printed by using the satellite-free drive voltage of the in-band density variable patterns by the lowest density head module, and the band-by-band density variable patterns by the adjacent head module, a drive voltage of the band-by-band density variable patterns of the adjacent head module having density in agreement in the direction perpendicular to the transport direction is determined to be a new reference voltage for the adjacent head module, where there is a further adjacent head module provided adjacent the adjacent head module, regarding those printed by using the new reference voltage for the adjacent head module of the in-band density variable patterns by the adjacent head module, and the band-by-band density variable patterns by the further adjacent head module, among the band-by-band density variable patterns by the further adjacent head module adjacent the adjacent head module, a drive voltage of the band-by-band density variable patterns of the further adjacent head module having density in agreement in the direction perpendicular to the transport direction is determined to be a new reference voltage for the further adjacent head module, or regarding those printed by using the new reference voltage for the adjacent head module of the band-by-band density variable patterns by the adjacent head module, and the in-band density variable patterns by the further adjacent head module, among the in-band density variable patterns by the further adjacent head module adjacent the adjacent head module, a drive voltage of the in-band density variable patterns of the further adjacent head module having density in agreement in the direction perpendicular to the transport direction is determined to be a new reference voltage for the further adjacent head module.

According to this invention, the printing controller has testing charts printed on the printing medium by dispensing ink droplets from the head while the printing medium is transported by the transporting device. And a lowest density head module is determined out of a plurality of head modules by using the lowest density head module check pattern, a satellite-free drive voltage is determined based on this lowest density head module and satellite check patterns, and this drive voltage is set as a new reference voltage for the lowest density head module. Then, drive voltages corresponding to the in-band density variable patterns or band-by-band density variable patterns of the adjacent head module having density in agreement with the density by the satellite-free drive voltage of the in-band density variable patterns or band-by-band density variable patterns printed by the lowest density head module are set as new reference voltage for the adjacent head modules. Further, when there is a head module further adjacent the adjacent head module, drive voltage corresponding to the in-band density variable patterns or band-by-band density variable patterns of the further adjacent head module having density in agreement with the density by the new reference voltage of the band-by-band density variable patterns or in-band density variable patterns printed by the adjacent head module is set as a new reference voltage for the further adjacent head module. Thus, the satellite-free drive voltage which produces no satellite is made a reference voltage for the lowest density head module, and drive voltage of the adjacent and further adjacent head modules in agreement with the density by the reference voltage are made reference voltages. Consequently, since the drive voltages for the adjacent head module and further adjacent head modules which are lower than that of the lowest density head module become reference voltages, the adjacent head module and further adjacent head module are also given drive voltages free from satellites. As a result, the density levels of ink droplets can easily be uniformed among the plurality of head modules, while inhibiting a deterioration of print quality.

In this invention, it is preferred that the apparatus an image acquiring unit for acquiring testing pattern images by scanning the testing patterns printed on the printing medium; and a reference voltage determiner for determining the lowest density head module, the satellite-free drive voltage, and the new reference voltage by performing image processing of the testing pattern images.

Since the reference voltage determiner for determines the lowest density head module and so on by performing image processing of the testing pattern images acquired by the image acquiring unit, the processes are carried out efficiently and accurately.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

FIG. 13 is a schematic view showing a further specific example of obtaining a new drive voltage for each head module.

DESCRIPTION OF THE PREFERRED EMBODIMENTS

One embodiment of this invention will be described hereinafter with reference to the drawings.

Figure 1:
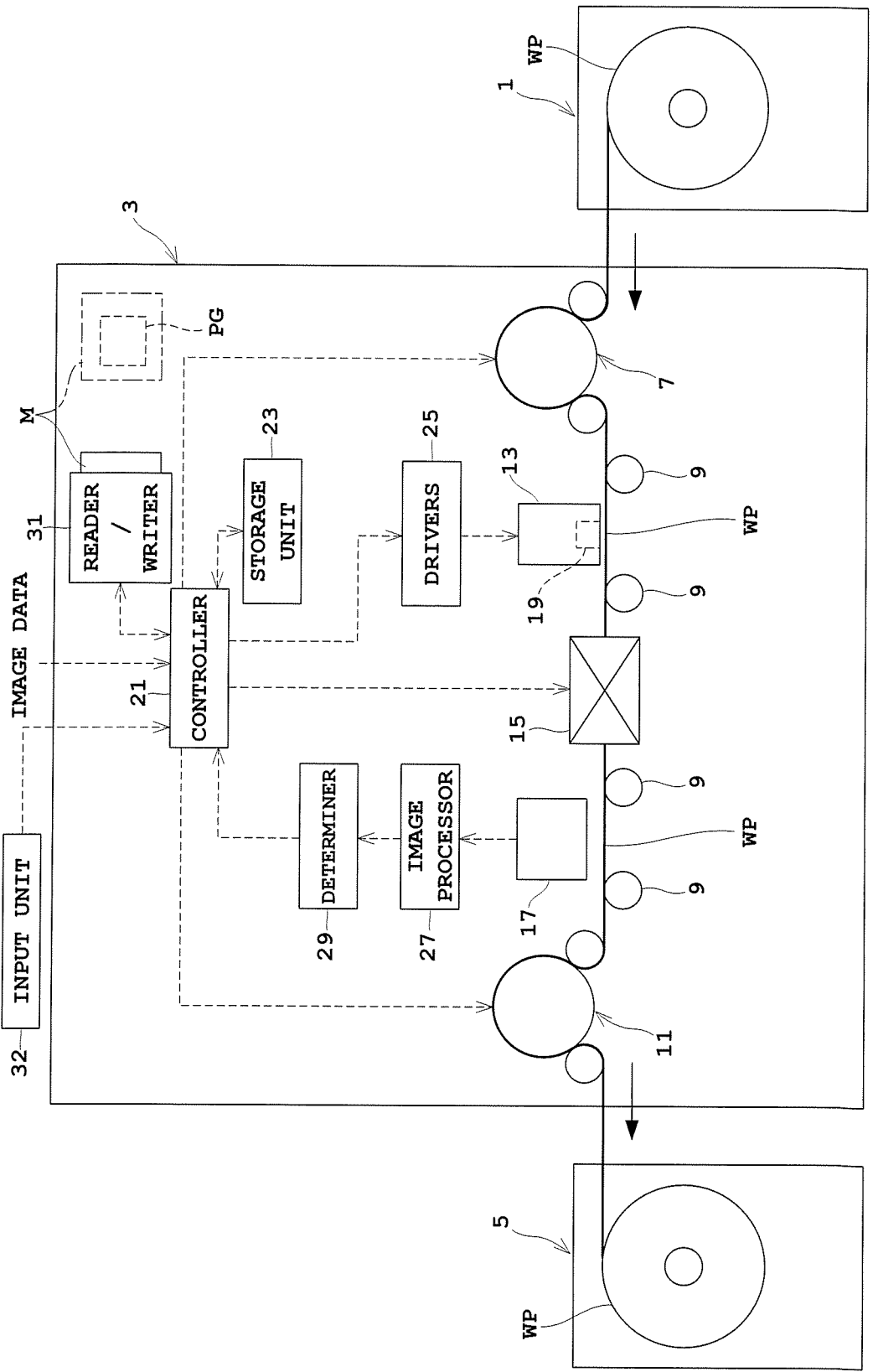
FIG. 1 is an outline schematic view showing an entire inkjet printing system according to an embodiment.
Figure 2:
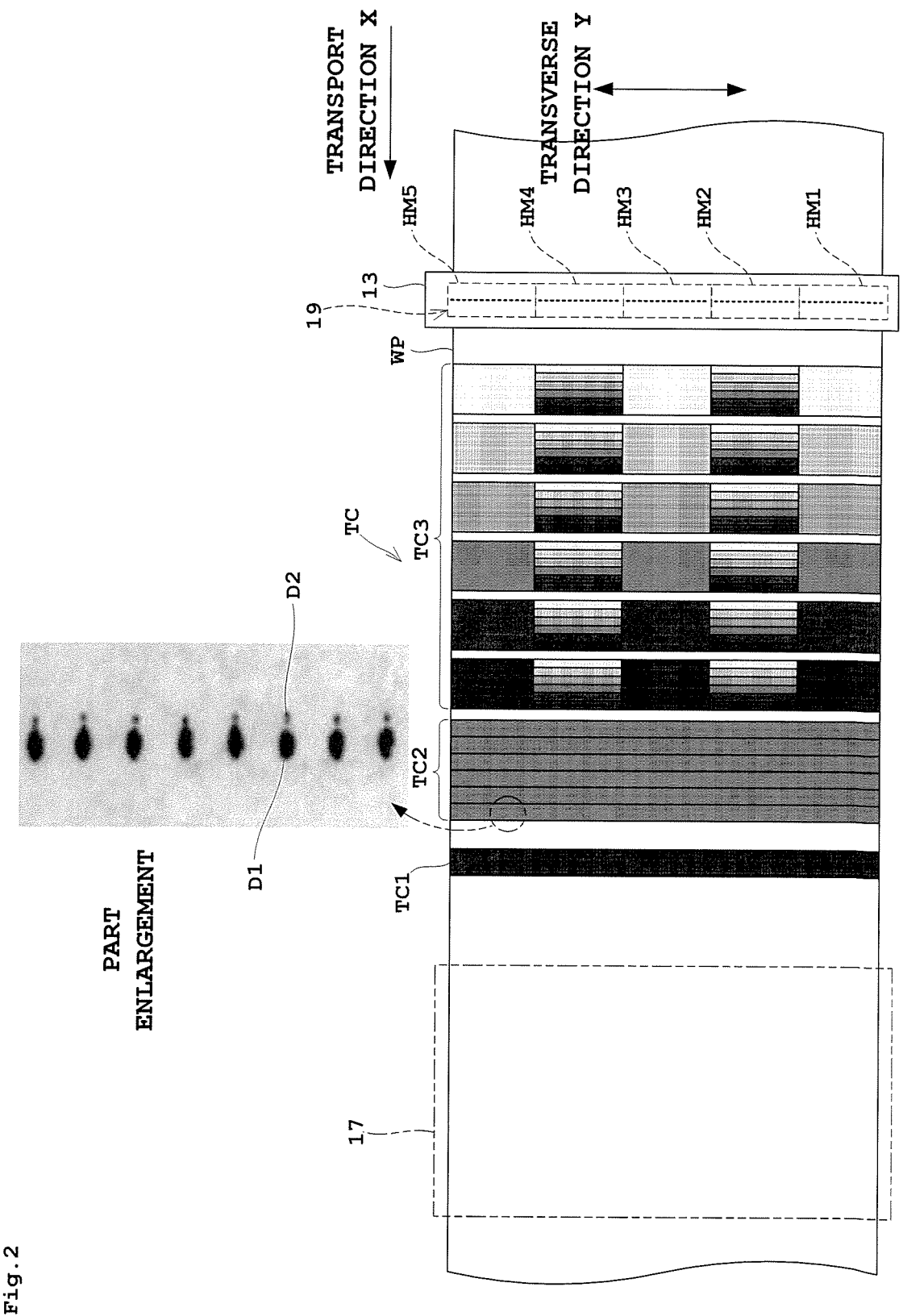
FIG. 2 is a plan view of a printing unit and web paper with testing charts printed thereon.

FIG. 1 is an outline schematic view showing an entire inkjet printing system according to the embodiment. FIG. 2 is a plan view of a head and web paper with testing charts printed thereon.

The inkjet printing system according to this embodiment includes a paper feeder 1, an inkjet printing apparatus 3 and a takeup roller 5.

The paper feeder 1 holds web paper WP in a roll form to be rotatable about a horizontal axis, and unwinds and feeds the web paper WP to the inkjet printing apparatus 3. The inkjet printing apparatus 3 performs printing on the web paper WP. The takeup roller 5 takes up on a horizontal axis the web paper WP printed in the inkjet printing apparatus 3. Referring to the side of feeding the web paper WP as upstream and that of discharging the web paper WP as downstream, the paper feeder 1 is located upstream of the inkjet printing apparatus 3, and the takeup roller 5 downstream thereof.

The inkjet printing apparatus 3 includes a drive roller 7 disposed in an upstream position for taking in the web paper WP from the paper feeder 1. The web paper WP unwound from the paper feeder 1 by the drive roller 7 is transported downstream along a plurality of transport rollers 9 toward the takeup roller 5. A drive roller 11 is disposed between the most downstream transport roller 9 and the takeup roller 5. This drive roller 11 feeds the web paper WP transported on the transport rollers 9 forward toward the takeup roller 5. The direction in which the web paper W is transported by the drive roller 7 and transport rollers 9 will be called herein the transport direction X.

The inkjet printing apparatus 3 has a printing unit 13, a dryer 15 and a scanning unit 17 arranged in the stated order from upstream between the drive roller 7 and drive roller 11. The dryer 15 dries portions printed by the printing unit 13. The scanning unit 17 is a mechanism for reading the web paper WP (printing medium) printed by the printing unit 13, and acquires testing chart images for checking whether the printed portions have stains, omissions or other defects, and for correcting a reference voltage which will be described hereinafter.

The printing unit 13 has heads 19 for dispensing ink droplets. It is common practice to provide a plurality of printing units 13 arranged along the transport direction of web paper WP. For example, four printing units 13 are provided separately for black (K), cyan (C), magenta (M), and yellow (Y). In this embodiment, description will be made assuming that only one printing unit 13 is provided, in order to facilitate understanding of the invention. The printing unit 13 includes heads 19 each with a plurality of nozzles just to be capable of printing without moving over a printing area transversely of the web paper WP (i.e. perpendicular to the plane of FIG. 1, which is a direction perpendicular to the transport direction X, and will be referred to as the transverse direction Y).

Each of these heads 19 has five head modules HM1-HM5, for example. The five head modules are arranged in the direction perpendicular to the transport direction X (i.e. in the transverse direction Y). That is, the inkjet printing apparatus 3 in this embodiment performs printing on the web paper WP while feeding the web paper WP in an auxiliary scanning direction relative to the head 19, with the heads 19 maintained stationary, not moving for main scans in the direction perpendicular to the transport direction of the web paper WP. Such a construction is called one-pass machine.

The drive rollers 7 and 11, printing unit 13, dryer 15, and scanning unit 17 are controlled overall by a controller 21.

The controller 21 includes a CPU, memory, and so on, and receives from outside print data including image information for printing on the web paper WP. The controller 21 carries out printing through the printing unit 13 by referring to reference voltages stored in a storage unit 23, and outputting drive voltages according to the print data to drivers 25. At this time, the controller 21 controls drive speed of the drive rollers 7 and 11 according to printing speed and ink droplet dispensation rate of the printing unit 13. The drivers 25 are provided as corresponding to the heads 19 of the printing unit 13. In this embodiment, therefore, since the number of heads 19 of the printing unit 13 is five, the number of drivers 25 is five. The controller 21 executes a program PG and the like to be described hereinafter to carry out various processes.

The storage unit 23 stores a reference voltage set in a unit-by-unit adjustment stage for each head 19 carried out before shipment of the apparatus, for example. The reference voltage herein is a drive voltage applied to each driver 25, when printing by each head 19, so that the density of ink droplets agree with a specified density level. As described in detail hereinafter, testing charts are printed with the heads 19 attached to the printing unit 13 of the inkjet printing apparatus 1, and the reference voltages in the storage unit 23 are updated and corrected with drive voltages obtained based on these testing charts.

Each driver 25 operates the corresponding head 19 according to the drive voltage given from the controller 21. For example, each head 19 includes a piezoelectric element extendible and contractible in response to the level of the voltage applied, and each driver 25 applies the drive voltage to the piezoelectric element. As shown in a partly enlarged view in an upper portion of FIG. 2, an area printed by a head 19 may include ink droplets forming, in terms of structure, main droplets D1 and satellite droplets D2 following the main droplets D1. However, with lowering of the drive voltage, the main droplets D1 and satellite droplets D2 may become indistinctively close together to appear integrated or leave only the main droplets D1.

The scanning unit 17 has built therein a scanner of relatively low resolution, for example. Its resolution is 1200 dpi, for example. The image data acquired by the scanning unit 17 is given to an image processor 27. In a voltage correction process described in detail hereinafter, testing charts read are acquired as testing chart images.

The image processor 27 carries out image processing for detecting defective portions of the images printed on the web paper WP at the time of product printing. At the time of head voltage correction process described hereinafter, the image processor 27 works on the testing chart images and carries out necessary image processing, such as a density value calculating process for obtaining new reference voltages, a process for determining distances between main droplet and satellite droplet among the ink droplets, and a process of calculating density differences between patterns.

A determiner 29, based on density values calculated by the image processor 27, finds one having the lowest density among the head modules HM1-5, and determines it to be the lowest density head module. The determiner 29, based on the distances between main droplet and satellite droplet, for example, finds a drive voltage producing no satellite at the lowest density head module, and determines this drive voltage to be a new reference voltage for the lowest density head module. Further, based on the density differences between patterns, the determiner 29 finds a drive voltage of an adjacent head module which is substantially in agreement with the density by the new drive voltage of the lowest density head module among head modules adjacent to the lowest density head module, and determines this drive voltage to be a new reference voltage for the adjacent head module. When there is a further head module adjacent to the above adjacent head module, the determiner 29 finds a drive voltage of the further adjacent head module which is substantially in agreement with the density by the new drive voltage of the adjacent head module, and determines this drive voltage to be a new reference voltage for the further adjacent head module. The new reference voltages determined by the determiner 29 are stored in the storage unit 23 as updates of the reference voltages of the head modules HM1-HM5 already stored in the storage unit 23.

A reader/writer 31 is connected to the controller 21. A program PG of the processes performed by this apparatus is stored in a storage medium M. This program PG is read by the controller 21 when the storage medium M is loaded into the reader/writer 31, and is executed by the controller 21. The storage medium M also stores data of the testing charts described hereinafter.

An input unit 32 such as a keyboard or pointing device is connected to the controller 21. An operator inputs analysis results of testing charts TC to the controller 21 through the input unit 32. Based on the analysis results, the controller 21 executes updating operations of the reference voltages for the head modules HM1-HM5.

The drive rollers 7 and 11 described above correspond to the "transporting device" in this invention. The controller 21 corresponds to the "print controller" in this invention. The scanning unit 17 corresponds to the "image acquiring device" in this invention. The image processor 27 and determiner 29 described above correspond to the "reference voltage determiner" in this invention.

Figure 3:
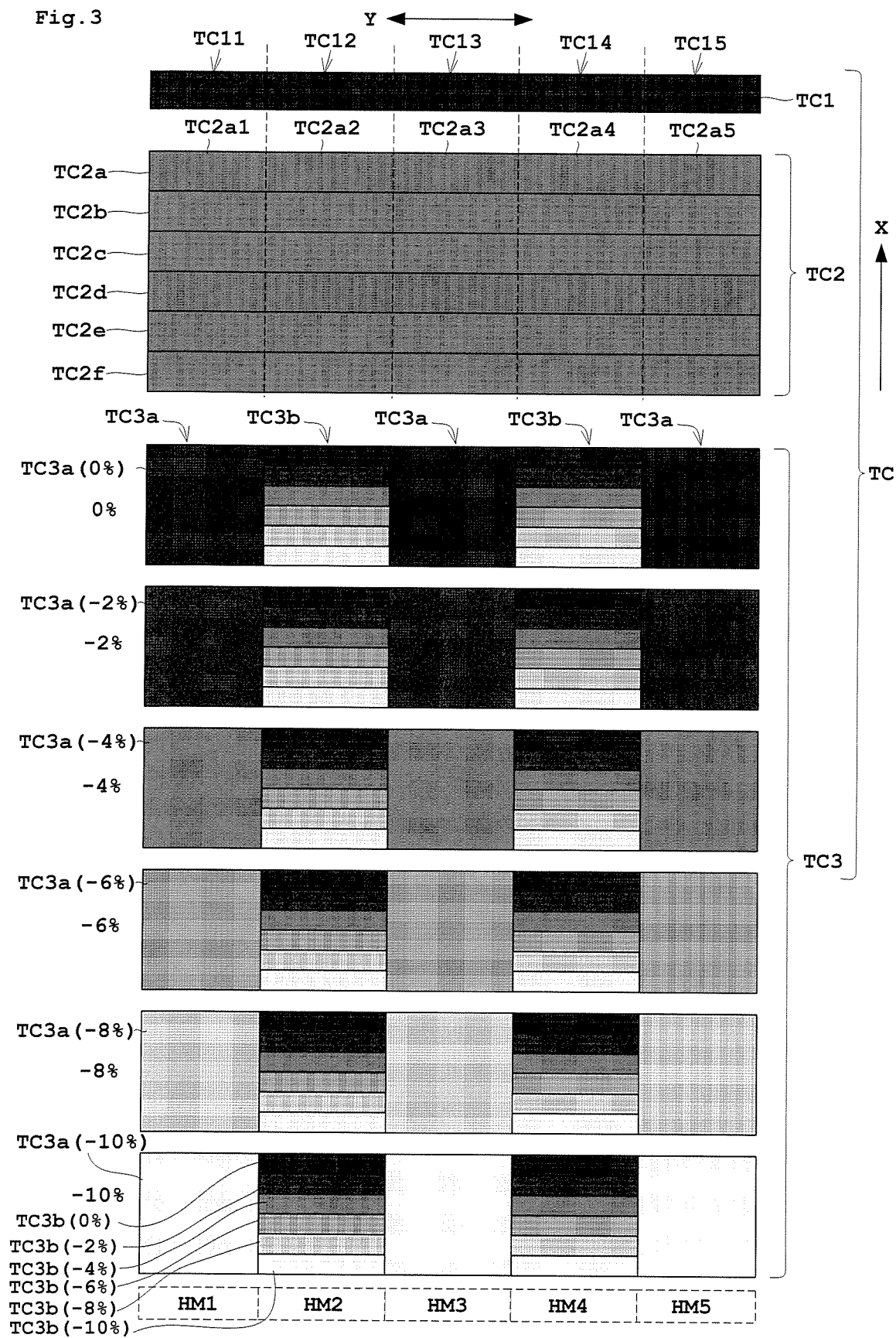
FIG. 3 is an enlarged view of the testing charts.
Figure 4:
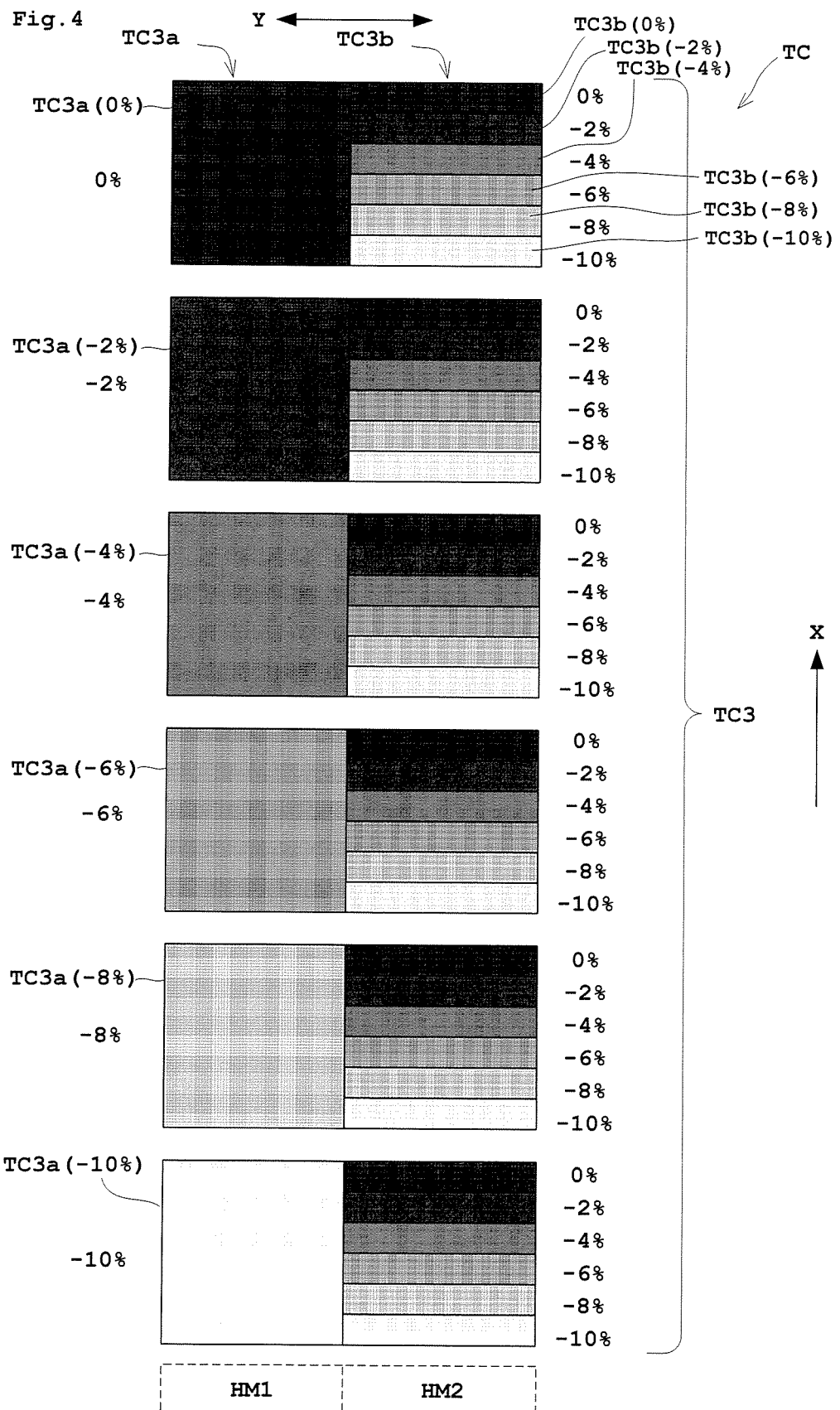
FIG. 4 is an enlarged view of a portion of the testing charts.

The testing charts TC used in the head voltage correction process will now be described with reference to FIGS. 3 and 4. FIG. 3 is an enlarged view of the testing charts. FIG. 4 is an enlarged view of a portion of the testing charts.

The testing charts TC are made up of a lowest density head module check pattern TC1, satellite check patterns TC2, and density variable patterns TC3 which include band-by-band density variable patterns TC3a and in-band density variable patterns TC3b. The band-by-band density variable patterns TC3a and in-band density variable patterns TC3b of the density variable patterns TC3 are alternately printed in the transverse direction Y. This can facilitate density comparison in the transverse direction Y.

The lowest density head module check pattern TC1 is a beltlike solid pattern printed by applying the reference voltages set beforehand as drive voltages for all the head modules HM1-HM5, respectively. The density at that time is a target density of 60%, for example. Since the density of 60% is not too dense and not too thin, people can visually determine the lowest density head module with ease. This lowest density head module check pattern TC1 does not need to be a beltlike solid, but may be a lattice pattern with varying density levels for enabling determination of the lowest density head module by average value. FIGS. 2 and 3 illustrate the lowest density head module check pattern TC1 as having uniform density in the transverse direction Y, but, in practice, density differences occur among the head modules HM1-HM5. By using this lowest density head module check pattern TC1, the head module with the lowest density when printing with the reference voltage can be determined as the lowest density head module.

The lowest density head module check pattern TC1 includes a plurality of patches TC11-TC15 juxtaposed in the transverse direction Y. In FIG. 3, imaginary lines are drawn in order to distinguish the patches TC11-TC15, but these imaginary lines are not printed in practice. The patches TC11-TC15 correspond to the head modules HM1-HM5, respectively, and are printed by applying, as initial drive voltages to the head modules HM1-HM5, the reference voltages set beforehand for the respective head modules HM1-HM5.

The satellite check patterns TC2 include beltlike patterns TC2a-TC2f printed with respective drive voltages for all the head modules HM1-HM5 along the transport direction X while changing the drive voltage at predetermined steps from each reference voltage. In this example, the satellite check patterns TC2 are formed by lowering the drive voltage at steps of −2% from each reference voltage. Specifically, it is made up of six beltlike patterns which are a satellite check pattern TC2a printed with the reference voltage used as drive voltage, a satellite check pattern TC2b printed with the reference voltage −2% used as drive voltage, a satellite check pattern TC2c printed with the reference voltage −4% as drive voltage, a satellite check pattern TC2d printed with the reference voltage −6% as drive voltage, a satellite check pattern TC2e printed with the reference voltage −8% as drive voltage, and a satellite check pattern TC2f printed with the reference voltage −10% as drive voltage. The satellite check patterns TC2 have density set to 10%, for example, to facilitate distinguishment between main droplet and satellite droplet of the ink droplets. FIGS. 2 and 3 show the density to be uniform in the transport direction but, in practice, delicate density variations occur according to the drive voltages. By using these satellite check patterns TC2, a drive voltage that causes the lowest density head module to produce no satellite at the time of printing can be determined to be a satellite-free drive voltage.

Each of the beltlike satellite check patterns TC2a-TC2f includes a plurality of patches in the transverse direction Y. Each of the patches is distinguishable as to which head module HM has printed, by affixing indexes "1"-"5" to the satellite check patterns TC2a-TC2f. For example, patch TC2a1 is a patch printed by the head module HM1, and patch TC2a2 is a patch printed by the head module HM2. Similarly, the patches TC2a3-TC2a5 are patches printed by the head modules HM3-HM5.

Details of the density variable patterns TC3 will be described with reference to FIG. 4.

The band-by-band density variable patterns TC3a of the density variable patterns TC3 are printed with a certain drive voltage over a predetermined length in the transport direction X, and are printed while changing the drive voltages at predetermined steps for each predetermined length in the transport direction X. For example, the band-by-band density variable patterns TC3a are in form of plural patches printed with drive voltages varied for each predetermined length as, for example, reference voltage (0%), reference voltage −2%, reference voltage −4%, reference voltage −6%, reference voltage −8%, and reference voltage −10% from downstream in the transport direction X, resulting in patches TC3a (0%), TC3a (−2%), TC3a (−4%), TC3a (−6%), TC3a (−8%), and TC3a (−10%). The predetermined length here is 60 mm, for example. That is, printing is done with the reference voltage for the first 60 mm, and with reference voltage −2% for the next 60 mm, thus adjusting to lower the reference voltage by steps of −2%, to make variations to reference voltage −10%. Note that printing may be started with reference voltage −10%, and gradually raising the drive voltage by steps of +2% up to the reference voltage.

In FIGS. 2 and 3, no density difference is apparent when the band-by-band density variable patterns TC3a of the head modules HM1, HM3 and HM5 are compared in the transverse direction Y. In practice, however, density differences occur even with the same drive voltage.

The in-band density variable patterns TC3b of the density variable patterns TC3 are printed by one of the head modules, e.g. the head module HM2 adjacent the head module HM1, while changing the drive voltage by predetermined steps within the predetermined length in the transport direction X of the band-by-band density variable patterns TC3a of the head module HM1. These drive voltage variations are done, as in the case of the above band-by-band density variable patterns TC3a, to change the drive voltage from the reference voltage (0%) to reference voltage −2%, reference voltage −4%, reference voltage −6%, reference voltage −8%, and reference voltage −10%, thereby printing a plurality of patches TC3b (0%), TC3b (−2%), TC3b (−4%), TC3b (−6%), TC3b (−8%), and TC3b (−10%). In FIGS. 2 and 3, no density difference is apparent when the in-band density variable patterns TC3b of the head modules HM2 and HM4 are compared in the transverse direction Y. In practice, however, density differences occur even with the same drive voltage.

Although details are described hereinafter, after a satellite-free voltage for the lowest density head module is determined, drive voltages for the other head modules are determined by using the density variable patterns TC3, which will result in agreement with the density by the satellite-free voltage for the lowest density head module. Consequently, the density levels of ink droplets can easily be uniformed for all the head modules while eliminating satellite droplets for all the head modules to inhibit a deterioration of print quality.

The reason will be explained here with reference to FIGS. 5 and 6 for being able to provide an optimal drive voltage for each of the head modules HM1-HM5 by selecting a satellite-free voltage of the lowest density head module, and adopting, as reference voltage, drive voltages of the other head modules corresponding to the density resulting from the satellite-free voltage. These FIGS. 5 and 6 are graphs based on actual measurements.

Figure 5:
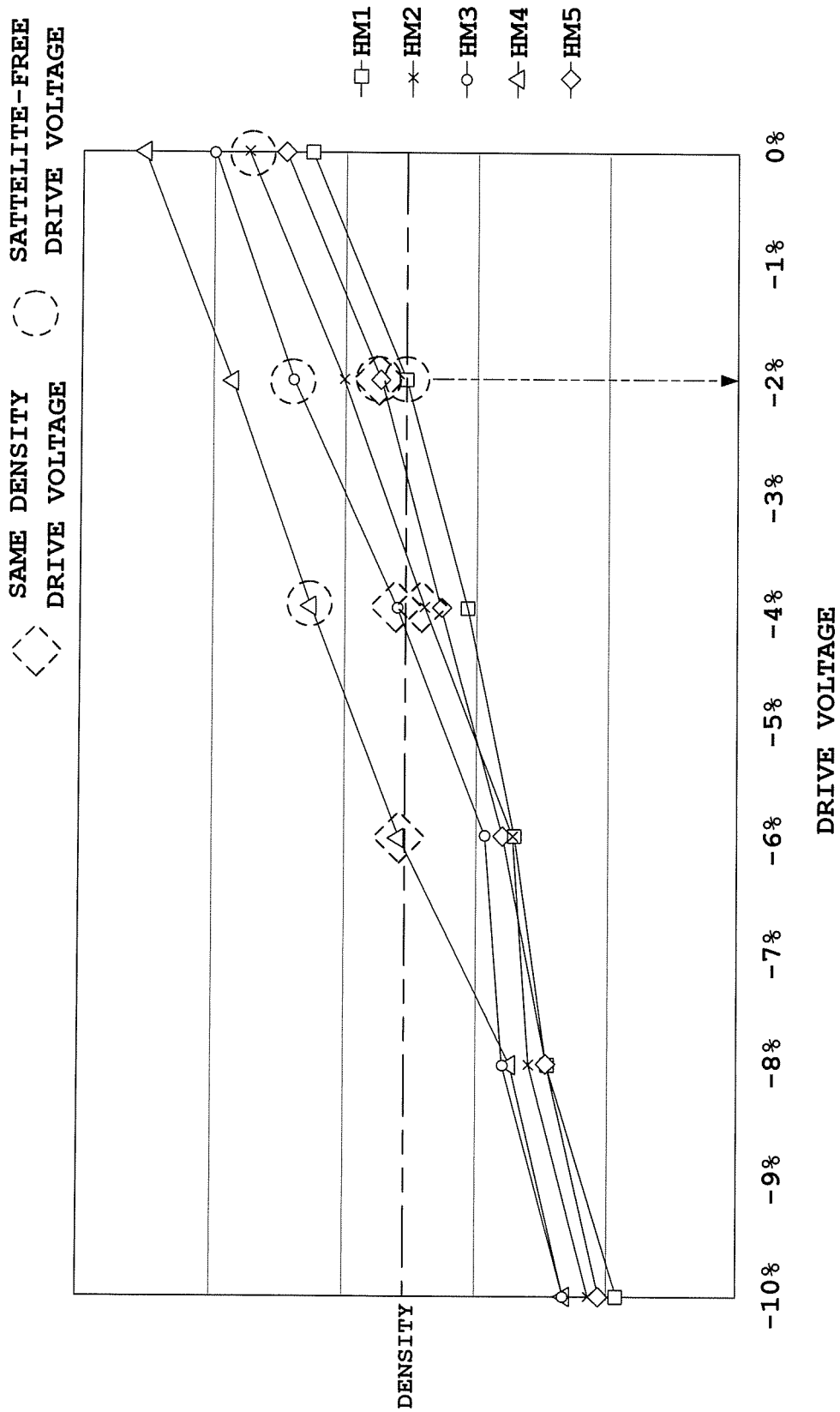
FIG. 5 is a graph showing a relationship between satellite-free drive voltage of a head module with the lowest density and satellite-free drive voltages of the other head modules.
Figure 6:
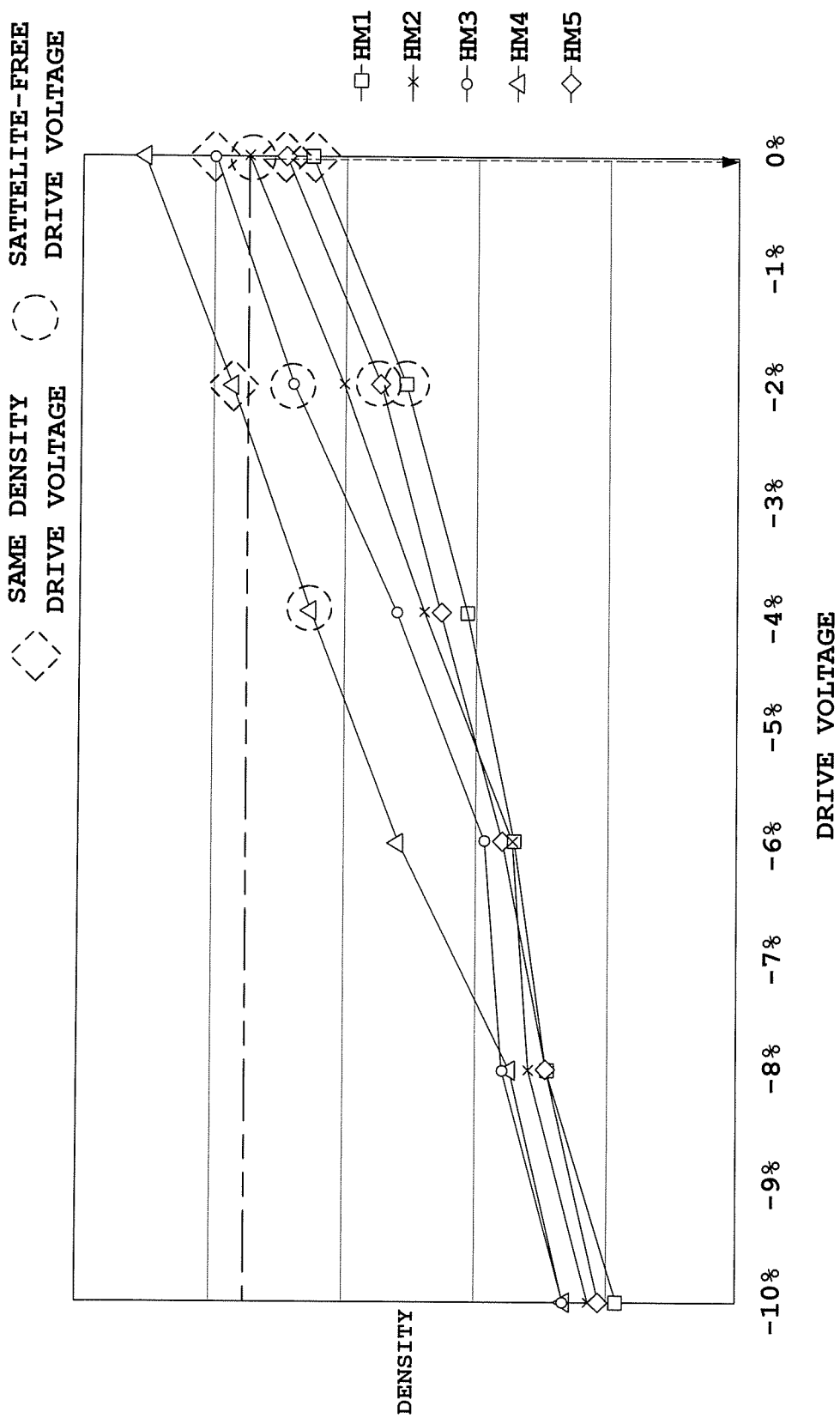
FIG. 6 is a graph showing a relationship between satellite-free drive voltage of a head module with medium density and satellite-free drive voltages of the other head modules.

FIG. 5 is a graph showing a relationship between satellite-free drive voltage of a head module with the lowest density and satellite-free drive voltages of the other head modules. FIG. 6 is a graph showing a relationship between satellite-free drive voltage of a head module with medium density and satellite-free drive voltages of the other head modules. As seen in these figures, generally, there is a characteristic that density becomes lower as drive voltage is lowered from reference voltage, and each head module has an individual difference in inclination and in satellite-free drive voltage.

In this example, the satellite-free voltage of head module HM1 is −2%, the satellite-free voltage of head module HM2 is reference voltage 0%, the satellite-free voltage of head module HM3 is reference voltage −2%, the satellite-free voltage of head module HM4 is reference voltage −4%, and the satellite-free voltage of head module HM5 is reference voltage −2%. In this case, a comparison of density between the head modules HM1-HM5 by drive voltage 0% which is reference voltage shows that the lowest density head module is head module HM1, and thus its satellite-free drive voltage is reference voltage −2%. A two-dot chain horizontal line is drawn for the density corresponding to the satellite-free drive voltage of this lowest density head module HM1. Then, drive voltages in the predetermined steps for the head modules HM2-HM5 other than the lowest density head module HM1 and corresponding to this two-dot chain horizontal line, or drive voltages in the predetermined steps for near positions, become the drive voltages for the head modules HM2-HM5, which provide almost the same density as that of the lowest density head module HM1.

Specifically, as shown in the rhombic shapes in broken lines in FIG. 5, reference voltage −4% becomes the drive voltage for head module HM2, reference voltage −4% becomes the drive voltage for head module HM3, reference voltage −6% becomes the drive voltage for head module HM4, and reference voltage −2% is determined as the drive voltage for head module HM5. It will be seen that each drive voltage determined in this way is lower than the satellite-free drive voltage of each of the head modules HM1-HM5. That is, the drive voltages determined in this way provide almost the same density for the respective head modules HM1-HM5, with the ink droplets not including satellite droplets. Thus, the density levels of the five head modules HM1-HM5 can easily be made uniform while inhibiting a deterioration of print quality.

Description will be made of the case where what is adopted as reference is the satellite-free voltage of the head module HM4 whose density is medium, unlike the lowest density head module, when given the reference voltage. In this case, since the head module which has medium density due to the reference voltage is head module HM2, its satellite-free drive voltage becomes reference voltage 0%. A two-dot chain horizontal line is drawn for the density corresponding to the satellite-free drive voltage of this head module HM2. Then, drive voltages in the predetermined steps for the head modules HM1 and HM3-HM5 other than head module HM2 corresponding to this two-dot chain horizontal line, or drive voltages in the predetermined steps for near positions, become the drive voltages for the head modules HM1-HM5, which provide the same density as that of the lowest density head module HM2.

Specifically, as shown in the rhombic shapes in broken lines in FIG. 6, reference voltage 0% becomes the drive voltage for head module HM1, reference voltage 0% becomes the drive voltage for head module HM3, reference voltage −2% becomes the drive voltage for head module HM4, and reference voltage 0% becomes the drive voltage for head module HM5. As distinct from the case of being determined with reference to the lowest density head module HM1 described hereinbefore, each drive voltage determined in this way is higher than the satellite-free drive voltage to act as reference voltage for each of the head modules HM1 and HM3-HM5. That is, it will be seen that the drive voltages producing satellite droplets are used as reference voltages, in which almost the same density is assured for the respective head modules HM1-HM5, but which cannot inhibit a deterioration of print quality.

Figure 7:
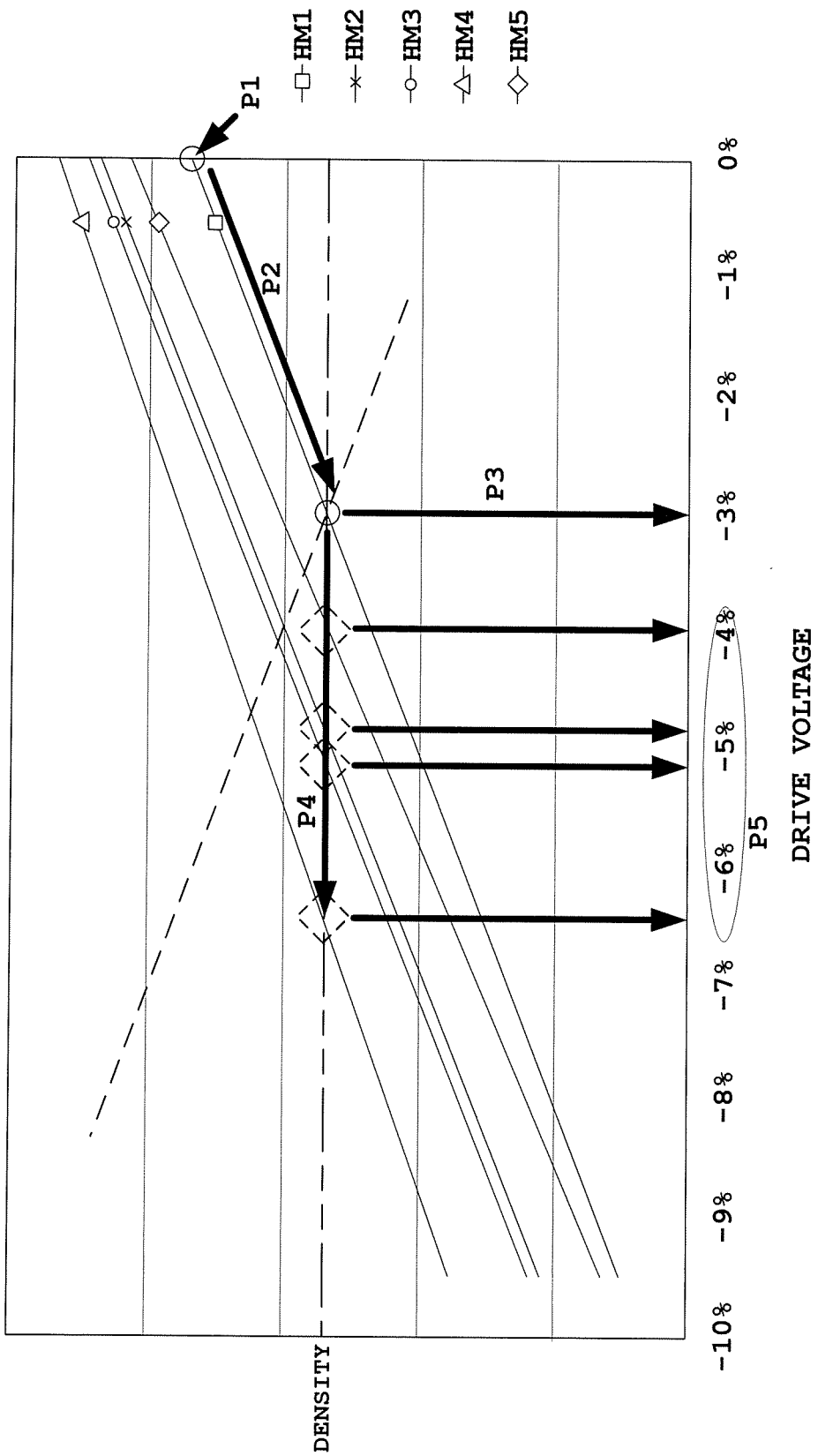
FIG. 7 is a schematic view showing a procedure of obtaining a new drive voltage for each head module after determining the lowest density head module.

Reference is now made to FIG. 7. FIG. 7 is a schematic view showing a procedure of obtaining a new drive voltage for each head module after determining the lowest density head module.

First, printing is done by all the head modules HM1-HM5 with their respective drive voltages, and head module HM1 with the lowest density among them is determined as the lowest density head module (sign P1 in FIG. 7). Next, a satellite-free drive voltage of the lowest density head module HM1 is determined (sign P2 in FIG. 7). Next, the satellite-free drive voltage is set as new reference voltage for the lowest density head module HM1 (sign P3 in FIG. 7). Then, drive voltages of the other head modules HM2-HM5 which are substantially in agreement with the density by the new reference voltage which is the satellite-free voltage for the lowest density head module HM1 are found (sign P4 in FIG. 7), and are adopted as new reference voltages for the other head modules HM2-HM5, respectively (sign P5 in FIG. 7). This procedure can determine a satellite-free drive voltage for forming ink droplets free of satellite droplets for any one lowest density head among the five head modules HM1-HM5. Then, without repeating the same procedure for the other four head modules to determine satellite-free drive voltages, new drive voltages providing substantially the same density and free of satellite droplets can be determined based on the satellite-free drive voltage of the lowest density head module.

The oblique broken line which crosses the satellite-free drive voltage (reference voltage −3%) of the head module HM1 in FIG. 7 is set based on Inventors' experience. This graph shows that, in the area below this broken line, satellite droplets do not occur to the ink droplets. Since the drive voltages of the head modules HM2-HM5 corresponding in density level to the satellite-free drive voltage of the lowest density head module HM1 are located in the area below the broken line, it will be appreciated that, by using these drive voltages as new reference voltages, such drive voltages produce no satellite droplets, thereby to inhibit a deterioration of print quality.

Figure 8:
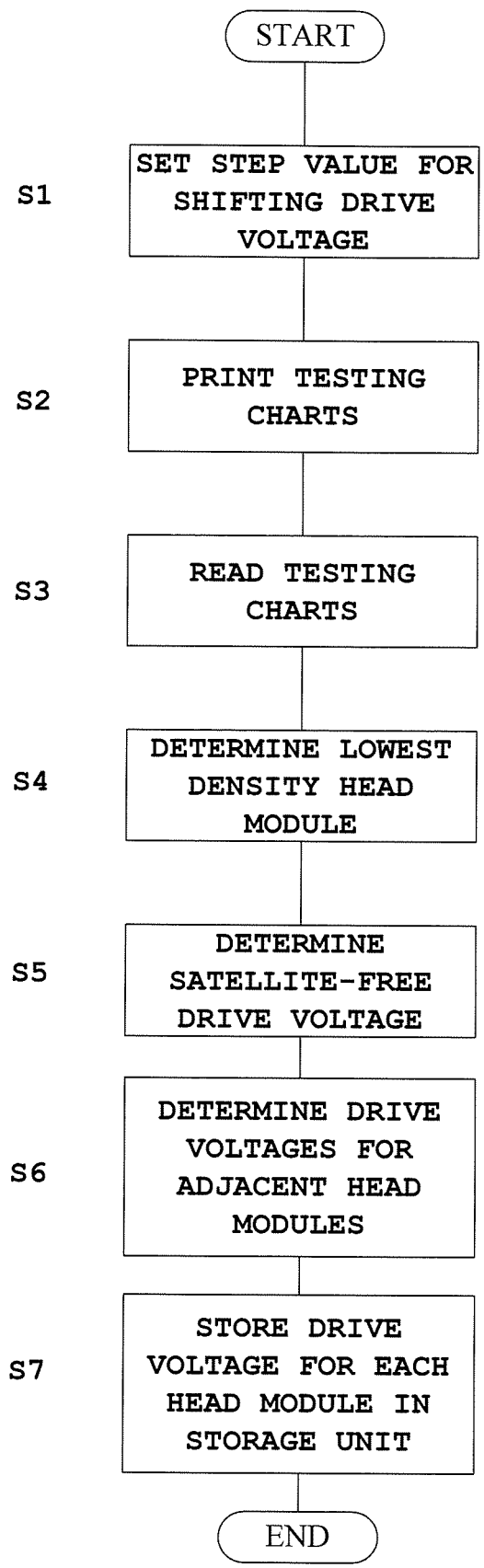
FIG. 8 is a flow chart showing a sequence of a head voltage correction process.
Figure 9:
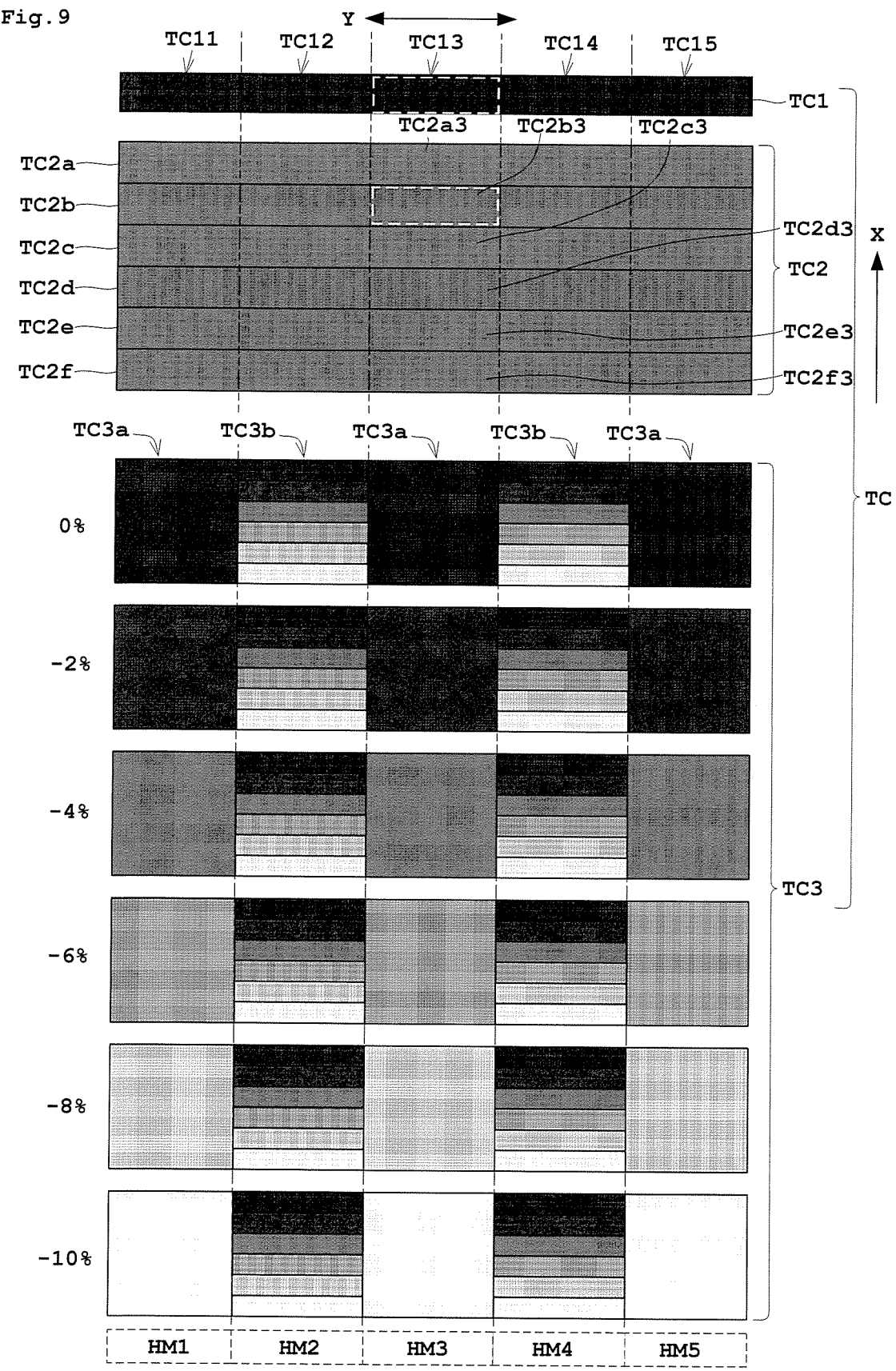
FIG. 9 is a schematic view showing a specific example of obtaining a new drive voltage for each head module.
Figure 10:
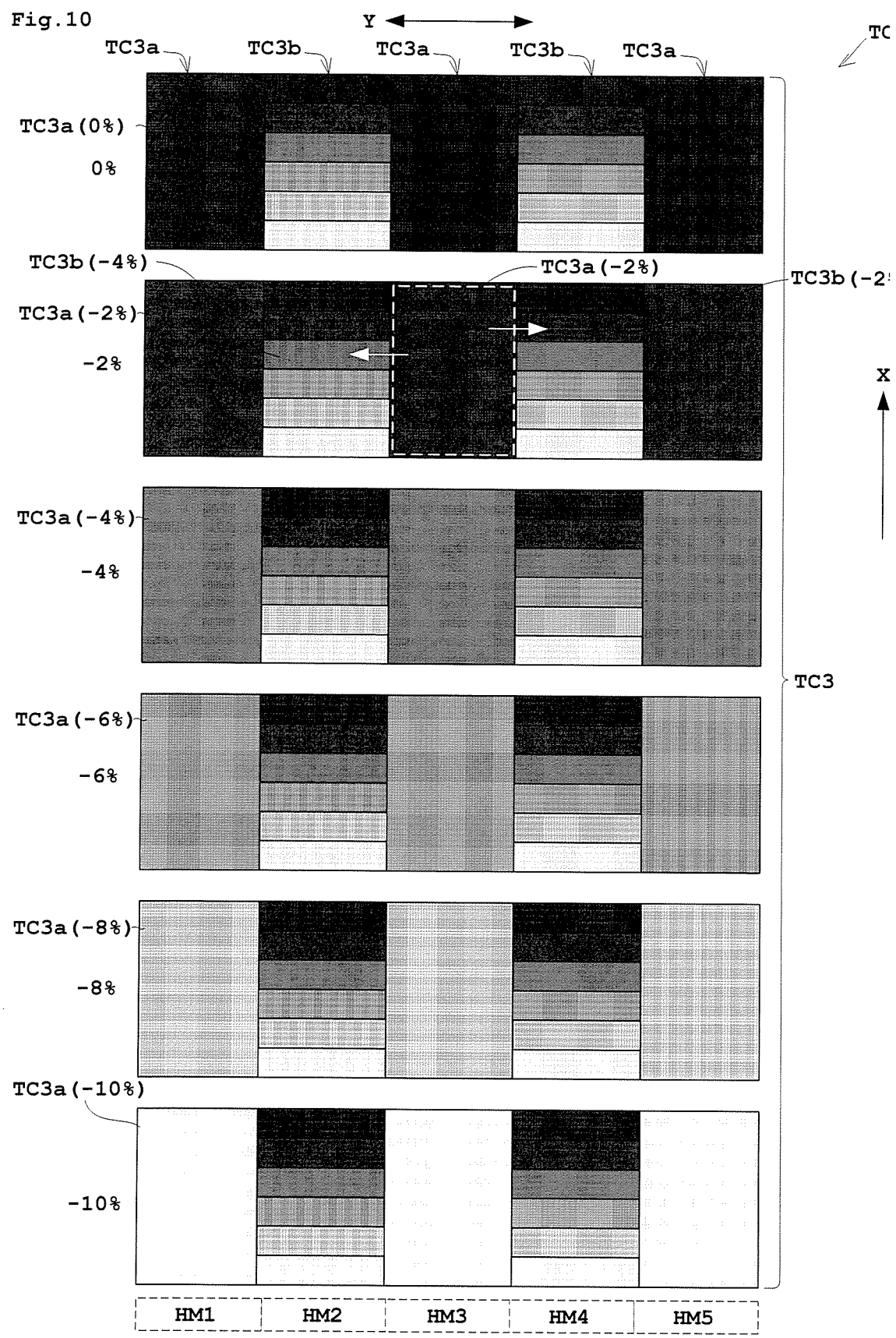
FIG. 10 is a schematic view showing a specific example of obtaining a new drive voltage for each head module.

Next, the head voltage correction process of the inkjet printing apparatus will be described in detail with reference to FIGS. 8 through 12. FIG. 8 is a flow chart showing the sequence of the head voltage correction process. FIGS. 9 through 12 are schematic views showing specific examples of obtaining a new drive voltage for each head module.

Assume here that the operator of the apparatus in this embodiment, by operating a setting unit not shown, has inputted in advance, a step value and the number of steps for shifting voltage relative to reference voltage, and these values are stored in the storage unit 23. In this embodiment, the step value is −2% and the number of steps is six, for example. The step value which is a rate by which this drive voltage is changed may be −1% or −3%, and this may be set according to the characteristics of the head modules HM1-HM5 or drivers 25. Each reference voltage acquired at the time of adjustment of individual head modules HM1-HM5 is also stored beforehand in the storage unit 23.

Step S1

The controller 21, by referring to the storage unit 23, sets a reference voltage for each of the head modules HM1-HM5. The step value and the number of steps for shifting drive voltage have been set beforehand to the controller 21. However, the step value and the number of steps may be set to the controller 21 by the operator inputting them from the input unit 32 to the controller 21, or by referring to the storage unit 23.

Step S2 (Corresponding to the "Testing Chart Printing Step" in this Invention)

The controller 21 causes the testing charts TC as shown in FIGS. 2-4 to be printed on the web paper WP.

Step S3 (Corresponding to the "Image Acquiring Step" in this Invention)

The controller 21 operates various components to cause the scanning unit 17 to read the testing chart TC. Consequently, the testing charts TC are acquired as digitized testing chart images.

Step S4 (Corresponding to the "Lowest Density Head Module Determining Step" in this Invention)

The image processor 27 performs a density comparison of the lowest density head module check pattern TC1 of the testing charts TC. Specifically, for example, density values of the plurality of patches TC11-TC15 of the lowest density head module check pattern TC1 are obtained for the respective head modules HM1-HM5. The determiner 29 identifies one with the lowest density from the density values of the plurality of patches TC11-TC15 obtained by the image processor 27, and determines the head module which can print the lowest density head module check pattern TC1 with the lowest density among the five head modules HM1-HM5. The head module determined in this way is regarded as the lowest density head module. In this example, as in the lowest density head module check pattern TC1 of the testing charts TC shown in FIG. 9, patch TC13 has the lowest density, and therefore the head module HM3 is regarded as the lowest density head module. A position corresponding to the lowest density head module HM3 is shown in a white dotted line in the lowest density head module check pattern TC1 in FIG. 9.

Note that the operator may measure the density levels of the patches TC11-TC15 formed in the testing charts TC, and may identify a patch with the lowest density based on the measured density levels from among the plurality of patches TC11-TC15.

Step S5 (Corresponding to the "Satellite-Free Drive Voltage Determining Step" and "Reference Pattern Determining Step" in this Invention)

The image processor 27 finds a distance between main droplet and satellite droplet of ink droplets for each drive voltage with respect to the plurality of patches printed by the lowest density head module HM3 among the satellite check patterns TC2 of the testing charts TC. Specifically, the image processor 27 analyzes the scanned image of each of the patches (TC2$a$3, TC2$b$3, TC2$c$3, TC2$d$3, TC2$e$3, and TC2$f$3) of the satellite check patterns TC2 printed by applying a plurality of drive voltages of different strengths to the head module HM3 which is the lowest density head module, and calculates a distance between main droplet and satellite droplet on each patch. The determiner 29 determines a patch, including no satellite droplet, of the satellite check patterns TC2 based on the distance between main droplet and satellite droplet calculated by the image processor 27 (determination of a reference pattern). Then, the drive voltage applied to the lowest density head module HM3 when that patch was printed is determined to be a satellite-free drive voltage. It is assumed here that a satellite droplet or droplets is/are included in patch TC2$a$3, but no satellite droplet is included in patch TC2$b$3 shown in a white line in the satellite check patterns TC2 of FIG. 9, nor in patches TC2$c$3-TC2$f$3. So, the determiner 29 determines the drive voltage applied to the head module HM3 at the time of printing the patch TC2$b$3 to be a satellite-free drive voltage. This satellite-free drive voltage becomes a new drive voltage for the lowest density head module HM3. That is, for the lowest density head module HM3, reference voltage −2% becomes a new reference voltage. Here, the position of the patch (TC2$b$3) corresponding to the satellite-free drive voltage is shown in a white dotted line in the satellite check patterns TC2 in FIG. 9. When two or more patches (TC2$b$3-TC2$f$3) are detected as including satellite droplets as in this example, what is necessary is just to select the patch (TC2$b$3) printed with the highest drive voltage applied.

The operator may be made to read the patches (TC2$a$3, TC2$b$3, TC2$c$3, TC2$d$3, TC2$e$3, and TC2$f$3) of the satellite check patterns TC2, and to determine a patch free from satellite droplets, from among these patches. The operator inputs from the input unit 32 to the controller 21 the drive voltage at the time of printing the patch free from satellite droplets as new reference voltage for the lowest density head module HM3.

Step S6 (Corresponding to the "New Reference Voltage Determining Step" in this Invention)

The image processor 27, regarding the density variable patterns TC3 of the testing charts TC, first determines all differences in density value in the transverse direction Y between the patches of band-by-band density variable patterns TC3a and the patches of in-band density variable patterns TC3b. The determiner 29 determines, regarding band-by-band density variable pattern TC3a (patch TC3a (−2%) shown in a white dotted line in FIG. 10) by the satellite-free drive voltage of the lowest density head module HM3, and in-band density variable patterns TC3b by the head modules HM2 and HM4 adjacent the lowest density head module HM3, determines the drive voltages when printing the patches of the in-band density variable patterns TC3b having density in agreement in the transverse direction Y to be new drive voltages for the adjacent head modules HM2 and HM4. In this invention, the case where the difference in density value is 0 and the case where the difference in density value is the closest to 0 are regarded as density being in agreement. It is assumed here that, as shown in white arrows in FIG. 10, the density is in agreement on patch TC3b (−4%) for head module HM2, and the density is in agreement on patch TC3b (−2%) for head module HM4. So, the determiner 29 determines reference voltage −4% of head module HM2 to be a new reference voltage for head module HM2. Similarly, the determiner 29 determines reference voltage −2% of head module HM4 as a new reference voltage for head module HM4.

The operator may be made to measure the density of each of the patches of density variable patterns TC3, e.g. TC3a (−2%), TC3b (0%), TC3b (−2%), TC3b (−4%), TC3b (−6%), TC3b (−8%), and TC3b (−10%), and to determine patches of the same density as patch T3a (−2%) from the density variable patterns TC3b. The operator inputs, from the input unit 32 to the controller 21, the drive voltages at the time of printing the patches determined in this way as new drive voltages for the head modules HM2 and HM4.

Figure 11:
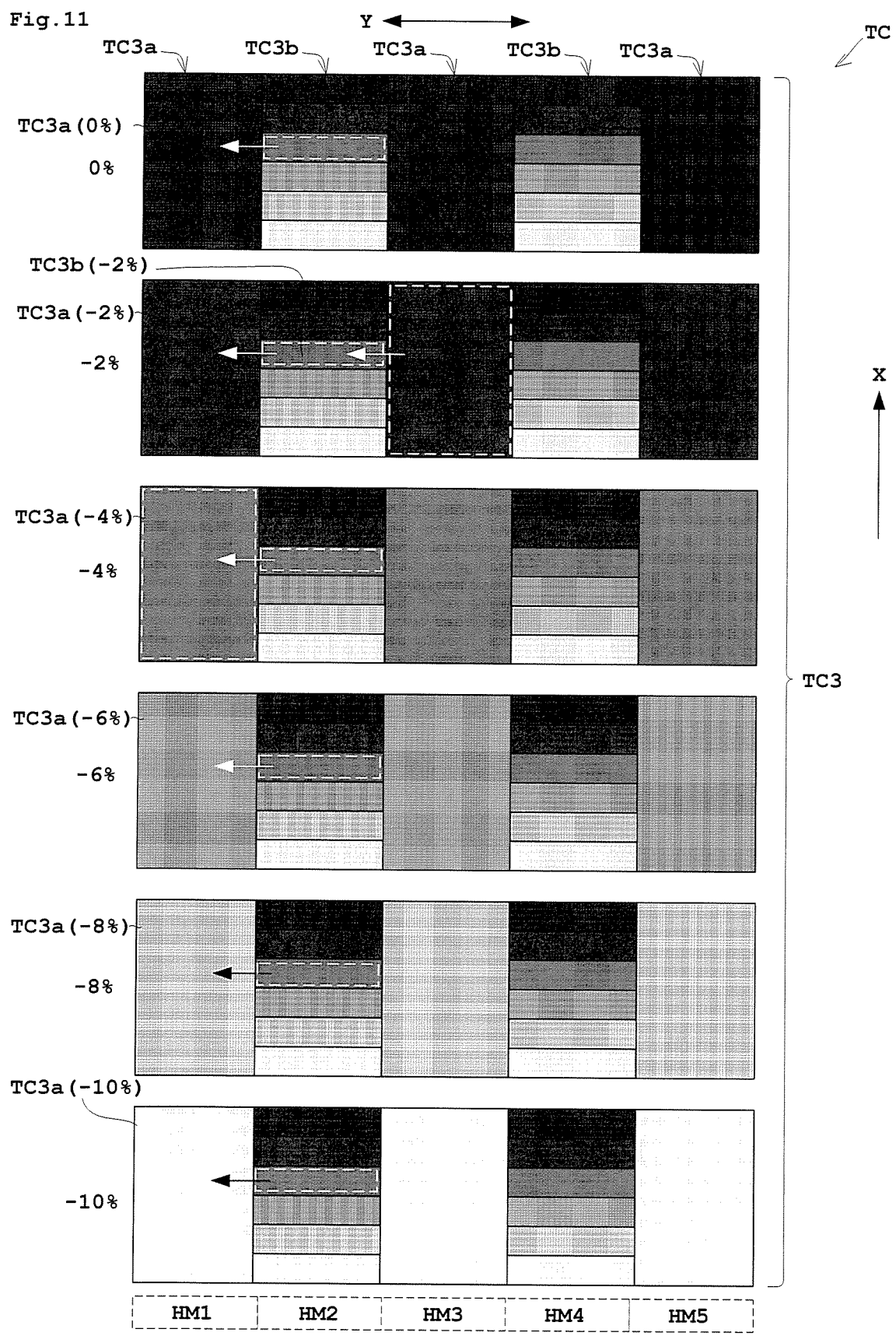
FIG. 11 is a schematic view showing a specific example of obtaining a new drive voltage for each head module.

Subsequently, when there are further head modules HM1 and HM5 adjacent the head modules HM2 and HM4 adjacent the lowest density head module HM3, the determiner 29, as shown in FIG. 11, searches patches (TC3b (−4%)) of in-band density variable patterns TC3b printed by the new reference voltage (reference voltage −4%) applied to the head module HM2, and patches TC3a (0%), TC3a (−2%), TC3a (−4%), TC3a (−6%), TC3a (−8%), and TC3a (−10%) of band-by-band density variable patterns TC3a of the further adjacent head module HM1, for a patch having density in agreement in a direction perpendicular to the transverse direction Y. The determiner 29 determines the drive voltage applied to the head module HM1 when printing the patch, having density in agreement, of band-to-band density variable patterns TC3a to be a new voltage for the head module HM1. It is assumed here that, as a result of density comparison shown in white arrows and black arrows in FIG. 11, patch TC3b (−4%) by the head module HM2 and patch TCa3a (−2%) by the head module HM1 have density in agreement as shown in white dotted lines. Consequently, the determiner 29 determines reference voltage −2% of the head module HM1 to be a new reference voltage for the head module HM1.

Figure 12:
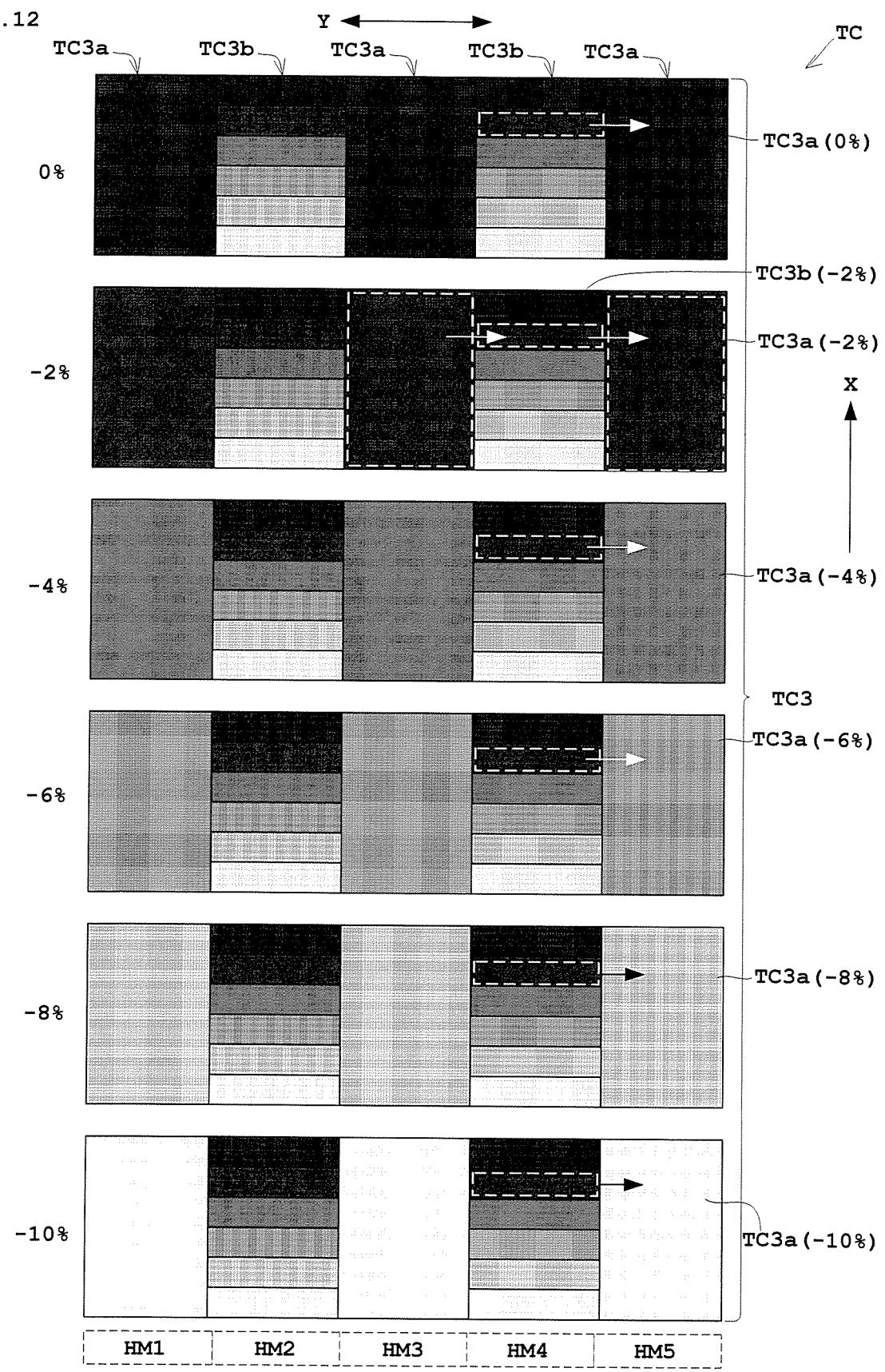
FIG. 12 is a schematic view showing a specific example of obtaining a new drive voltage for each head module.

Similarly, as shown in FIG. 12, the determiner 29 searches patches (TC3b (−2%)) of in-band density variable patterns TC3b printed by the new reference voltage (reference voltage −2%) applied to the head module HM4, and patches TC3a (0%), TC3a (−2%), TC3a (−4%), TC3a (−6%), TC3a (−8%), and TC3a (−10%) of band-by-band density variable patterns TC3a of the further adjacent head module HM5, for a patch having density in agreement in the transverse direction Y. The determiner 29 determines the drive voltage applied to the head module HM5 when printing the patch, having density in agreement, of band-to-band density variable patterns TC3a to be a new voltage for the head module HM5. It is assumed here that, as a result of density comparison shown in white arrows and black arrows in FIG. 12, patch TC3b (−2%) by the head module HM4 and patch TCa3a (−2%) by the head module HM5 have density in agreement as shown in white dotted lines. Consequently, the determiner 29 determines reference voltage −2% of the head module HM1 to be a new reference voltage for the head module HM5.

Step S7

The new reference voltage for each of the head modules HM1-HM5 determined in this way by the determiner 29 is stored in the storage unit 23 through the controller 21. At this time, the original reference voltages of the head modules HM1-HM5 stored beforehand are rewritten to be updated.

In the above example, the lowest density head module is HM3 and the density variable patterns TC3 are band-to-band density variable patterns TC3a. When, for example, the lowest density head module is the head module HM4 which corresponds to the in-band density variable patterns TC3b of the density variable patterns TC3, the above new reference voltage may be determined as shown in FIG. 13.

That is, supposing the satellite-free drive voltage of the lowest density head module HM4 is reference voltage −2%, comparison is made in the transport direction and perpendicular direction between the density corresponding to reference voltage −2% of in-band density variable patterns TC3b by the head module HM4 and the density of band-to-band density variable patterns TC3a by adjacent head modules HM3 and HM5. When there are further head modules adjacent the head modules HM3 and HM5, drive voltages may be determined, by the above technique, which provide density in agreement between the further head modules.

According to this embodiment, one lowest density head module HM3 is determined out of five head modules HM1-HM5 by using the lowest density head module check pattern TC1, a satellite-free drive voltage is determined based on this lowest density head module HM3 and satellite check patterns TC2, and this drive voltage is set as a new reference voltage for the lowest density head module HM3. Then, drive voltages corresponding to in-band density variable patterns TC3b of adjacent head modules HM2 and HM4 having density in agreement with the density by the satellite-free drive voltage of band-by-band density variable patterns TC3a printed by the lowest density head module HM3 are set as new reference voltages for the adjacent head modules HM2 and HM4.

Further, when there are further head modules HM1 and HM5 adjacent the adjacent head modules HM2 and HM4, drive voltages corresponding to band-by-band density variable patterns TC3a of the further adjacent head modules HM1 and HM5 having density in agreement with the density by the new reference voltage of in-band density variable patterns TC3b printed by the adjacent head modules HM2 and HM4 are set as new reference voltages for the further adjacent head modules HM1 and HM5. Thus, the satellite-free drive voltage which produces no satellite is made a reference voltage for the lowest density head module HM3, and drive voltages of the adjacent head modules HM2 and HM4 substantially in agreement with the density by the reference voltage are made reference voltages for the adjacent head modules HM2 and HM4. Consequently, since the drive voltages for the adjacent head modules HM2 and HM4 and further adjacent head modules HM1 and HM5 which are lower than that of the lowest density head module HM3 become reference voltages, the adjacent head modules HM2 and HM4 and further adjacent head modules HM1 and HM5 are also given drive voltages free of satellites. As a result, the density levels of ink droplets can easily be uniformed among the five head modules HM1-HM5, while inhibiting a deterioration of print quality.

This invention is not limited to the foregoing embodiment, but may be modified as follows:

(1) In the foregoing embodiment, each head 19 includes five head modules HM1-HM5. This invention is not limited to such construction. That is, this invention is applicable to any construction as long as each head 19 includes two or more head modules.

(2) In the foregoing embodiment, the testing charts TC include, arranged in order from downstream to upstream in the transport direction, the lowest density head module check pattern TC1, satellite check patterns TC2, and density variable patterns TC3 including band-to-band density variable patterns TC3*a* and in-band density variable patterns TC3*b*. This invention is not limited to such arrangement. In this invention, the testing charts TC may include the lowest density head module check pattern TC1, satellite check patterns TC2, and density variable patterns TC3 arranged in any order.

(3) In the foregoing embodiment, the satellite check patterns TC2 are formed by lowering drive voltage in steps of −2% from each reference voltage. However, this invention is not limited to such. The satellite check patterns TC2 may be formed by raising drive voltage in predetermined plus (+) steps from minimum drive voltage toward each reference voltage. In the foregoing embodiment, the satellite check patterns TC2 include six beltlike patterns. This invention is not limited to this number of pattern.

(4) In the foregoing embodiment, testing chart images of the testing charts TC are acquired by the scanning unit 17, and the image processor 27 and determiner 29 determine the lowest density head module, satellite-free drive voltages, and new drive voltages. However, a person may visually check the testing charts TC, make determinations including a final determination on the new drive voltages, and operate the input unit 32 to store the new reference voltages in the storage unit 23.

(5) In the foregoing embodiment, the lowest density head module check pattern TC1 is printed in a 60% density solid. This invention is not limited to this. That is, the density may be any % as long as the lowest density head module can be determined.

(6) In the foregoing embodiment, the web paper WP is used as printing medium. This invention is not limited to this. For example, it may be cut paper, and may be film instead of paper.

(7) In the foregoing embodiment, a one-path machine is illustrated as printing apparatus, but the transport system of the recording medium is not limited to this. For example, this invention is applicable also to a printing apparatus of the type that performs printing while moving the head in directions perpendicular to the transport direction of the recording medium.

This invention may be embodied in other specific forms without departing from the spirit or essential attributes thereof and, accordingly, reference should be made to the appended claims, rather than to the foregoing specification, as indicating the scope of the invention.

What is claimed is:

1. A head voltage correcting method for inkjet printing apparatus which perform printing on a printing medium with a head having a plurality of head modules, each with a plurality of nozzles for dispensing ink droplets, the head modules being arranged in a direction perpendicular to a transport direction of the printing medium, the method comprising:
    a testing chart printing step for printing testing charts on the printing medium, the testing charts including:
        a lowest density head module check pattern printed by using, as a drive voltage, a reference voltage set beforehand for each of the head modules;
        satellite check patterns printed with respective drive voltages along the transport direction while changing the drive voltage at predetermined steps from the reference voltage for each of the head modules;
        band-by-band density variable patterns printed by one of the head modules, each by using a certain drive voltage over a predetermined length in the transport direction, which patterns being printed while changing the drive voltage at predetermined steps for each predetermined length in the transport direction; and
        in-band density variable patterns printed by a head module adjacent the one of the head modules, each of which patterns is printed by changing the drive voltage at predetermined steps within the predetermined length in the transport direction of the band-by-band density variable patterns;
    a lowest density head module determining step for determining, from the lowest density head module check pattern, a head module with minimum density to be a lowest density head module;
    a satellite-free drive voltage determining step for determining, from the satellite check patterns, the drive voltage which does not cause the lowest density head module to produce satellites, to be a satellite-free drive voltage, and determining the satellite-free drive voltage to be a new reference voltage for the lowest density head module; and
    a new reference voltage determining step, regarding the band-by-band density variable patterns or the in-band density variable patterns printed by using the satellite-free drive voltage among the band-by-band density variable patterns or the in-band density variable patterns by the lowest density head module, and the in-band density variable patterns or the band-by-band density variable patterns by the adjacent head module, for determining a drive voltage of the in-band density variable patterns or the band-by-band density variable patterns of the adjacent head module having density in agreement in the direction perpendicular to the transport direction to be a new reference voltage for the adjacent head module.

2. The head voltage correcting method for inkjet printing apparatus according to claim 1, further comprising an image acquiring step executed after the testing chart printing step for acquiring testing pattern images by scanning the testing patterns;
    wherein the lowest density head module determining step, the satellite-free drive voltage determining step, and the new reference voltage determining step are executed by image processing of the testing pattern images.

3. The head voltage correcting method for inkjet printing apparatus according to claim 2, wherein the lowest density head module check pattern is a solid of 60% target density by the reference voltage.

4. The head voltage correcting method for inkjet printing apparatus according to claim 2, wherein the predetermined steps are set to −2% each from reference voltage 0%.

5. The head voltage correcting method for inkjet printing apparatus according to claim 1, wherein the lowest density head module check pattern is a solid of 60% target density by the reference voltage.

6. The head voltage correcting method for inkjet printing apparatus according to claim 1, wherein the predetermined steps are set to −2% each from reference voltage 0%.

7. The head voltage correcting method for inkjet printing apparatus according to claim 1, wherein the band-by-band density variable patterns and the in-band density variable patterns of the testing charts are printed alternately in the direction perpendicular to the transport direction of the printing medium.

8. The head voltage correcting method for inkjet printing apparatus according to claim 1, wherein the band-by-band density variable patterns and the in-band density variable patterns of the testing charts are printed alternately in the direction perpendicular to the transport direction of the printing medium.

9. An inkjet printing apparatus for printing on a printing medium by dispensing ink droplets thereto, the apparatus comprising:
- a head including a plurality of head modules arranged in a direction perpendicular to a transport direction of the printing medium, each of the head modules having a plurality of nozzles for dispensing the ink droplets;
- a transporting device disposed in a position spaced from and opposed to the head for transporting the printing medium; and
- a printing controller for printing testing charts on the printing medium, the testing charts including
  - a lowest density head module check pattern printed by using, as a drive voltage, a reference voltage set beforehand for each of the head modules;
  - satellite check patterns printed with respective drive voltages along the transport direction while changing the drive voltage at predetermined steps from the reference voltage for each of the head modules;
  - band-by-band density variable patterns printed by one of the head modules, by using a certain drive voltage over a predetermined length in the transport direction, while changing the drive voltage at a predetermined step for each predetermined length in the transport direction; and
  - in-band density variable patterns printed by a head module adjacent the one of the head modules, while changing the drive voltage at a predetermined step within the predetermined length in the transport direction of the band-by-band density variable patterns;
- wherein, from the lowest density head module check pattern, a head module with minimum density is determined to be a lowest density head module;
- from the satellite check patterns, the drive voltage which does not cause the lowest density head module to produce satellites is determined to be a satellite-free drive voltage, and the satellite-free drive voltage is determined to be a new reference voltage for the lowest density head module; and
- regarding the band-by-band density variable patterns or the in-band density variable patterns printed by using the satellite-free drive voltage among the band-by-band density variable patterns or the in-band density variable patterns by the lowest density head module, and the in-band density variable patterns or the band-by-band density variable patterns by the adjacent head module, a drive voltage of the in-band density variable patterns or the band-by-band density variable patterns of the adjacent head module having density in agreement in the direction perpendicular to the transport direction is determined to be a new reference voltage for the adjacent head module, or regarding those printed by using the satellite-free drive voltage of the in-band density variable patterns by the lowest density head module, and the band-by-band density variable patterns by the adjacent head module, a drive voltage of the band-by-band density variable patterns of the adjacent head module having density in agreement in the direction perpendicular to the transport direction is determined to be a new reference voltage for the adjacent head module.

10. The inkjet printing apparatus according to claim 9, further comprising:
- an image acquiring unit for acquiring testing pattern images by scanning the testing patterns printed on the printing medium; and
- a reference voltage determiner for determining the lowest density head module, the satellite-free drive voltage, and the new reference voltage by performing image processing of the testing pattern images.

11. A non-transitory tangible machine-readable recording medium storing a head voltage correcting program for inkjet printing apparatus which perform printing on a printing medium with a head having a plurality of head modules, each with a plurality of nozzles for dispensing ink droplets, the head modules being arranged in a direction perpendicular to a transport direction of the printing medium, the program comprising the following processes executed by a controller:
- a testing chart printing process for printing testing charts on the printing medium, the testing charts including:
  - a lowest density head module check pattern printed by using, as a drive voltage, a reference voltage set beforehand for each of the head modules;
  - satellite check patterns printed with respective drive voltages along the transport direction while changing the drive voltage at predetermined steps from the reference voltage for each of the head modules;
  - band-by-band density variable patterns printed by one of the head modules, each by using a certain drive voltage over a predetermined length in the transport direction, which patterns being printed while changing the drive voltage at predetermined steps for each predetermined length in the transport direction; and
  - in-band density variable patterns printed by a head module adjacent the one of the head modules, each of which patterns is printed by changing the drive voltage at predetermined steps within the predetermined length in the transport direction of the band-by-band density variable patterns;
- a lowest density head module determining process for determining, from the lowest density head module check pattern, a head module with minimum density to be a lowest density head module;
- a satellite-free drive voltage determining process for determining, from the satellite check patterns, the drive voltage which does not cause the lowest density head module to produce satellites, to be a satellite-free drive voltage, and determining the satellite-free drive voltage to be a new reference voltage for the lowest density head module; and a new reference voltage determining process, regarding the band-by-band density variable patterns or the in-band density variable patterns printed by using the satellite-free drive voltage among the band-by-band density variable patterns or the in-band density variable patterns by the lowest density head module, and the in-band density variable patterns or the band-by-band density variable patterns by the adjacent head module, for determining a drive voltage of the in-band density variable patterns or the band-by-band density variable patterns of the adjacent head module having density in agreement in the direction perpendicular to the transport direction to be a new reference voltage for the adjacent head module.

12. A head voltage correcting method for inkjet printing apparatus which perform printing with a head having a plurality of head modules, each having a plurality of nozzles for dispensing ink droplets, on a printing medium moving relative to the head, the method comprising:
 a lowest density head module determining step for causing the head to print lowest density head module check patterns on the printing medium by applying a reference voltage to each of the head modules, and determining a lowest density head module capable of printing on the printing medium in lower density between the head modules by determining one of the lowest density head module check patterns having the lower density between the lowest density head module check patterns;
 a satellite-free drive voltage determining step for causing the lowest density head module to print a plurality of satellite check patterns on the printing medium by applying thereto a plurality of different strength drive voltages lower than the reference voltage, identifying a satellite-free pattern from the plurality of satellite check patterns, and determining the drive voltage of the time when the satellite-free pattern to be a satellite-free drive voltage;
 a reference pattern determining step for determining the satellite-free pattern to be a reference pattern; and
 a new reference voltage determining step for causing a non-lowest density head module, which does not correspond to the lowest density head module of the first and second head modules, to print a plurality of density variable patterns on the printing medium by applying thereto a plurality of different strength drive voltages lower than the satellite-free drive voltage, identifying a pattern with the same density as the reference pattern from among the density variable patterns, setting the drive voltage of the time when the density pattern as new reference voltage for the non-lowest density head module, and setting the satellite-free drive voltage as new reference voltage for the lowest density head module.

13. The head voltage correcting method for inkjet printing apparatus according to claim 12, wherein an operator is made to measure density of the lowest density head module check patterns, and the operator is made to determine a lowest density head module check pattern with low density from among the lowest density head module check patterns.

14. The head voltage correcting method for inkjet printing apparatus according to claim 12, wherein an operator is made to read the satellite check patterns, and the operator is made to determine a satellite-free pattern from among the satellite check patterns.

15. The head voltage correcting method for inkjet printing apparatus according to claim 12, wherein an operator is made to measure density of the density variable patterns, and the operator is made to determine a pattern with the same density as the reference pattern from among the density variable patterns.

* * * * *